United States Patent
Cragun

(10) Patent No.: US 6,192,383 B1
(45) Date of Patent: Feb. 20, 2001

(54) METHOD AND SYSTEM IN A COMPUTER NETWORK FOR AUTOMATICALLY ADDING SYNCHRONIZATION POINTS TO NETWORK DOCUMENTS

(75) Inventor: Brian John Cragun, Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/150,708

(22) Filed: Sep. 10, 1998

(51) Int. Cl.[7] .................................................. G06F 17/21

(52) U.S. Cl. ........................................... 707/513; 707/201

(58) Field of Search .................................. 707/530, 501, 707/513, 201; 345/329, 332, 331, 302; 709/217–219, 203–204

(56) References Cited

U.S. PATENT DOCUMENTS

| | | | |
|---|---|---|---|
| 4,974,173 | 11/1990 | Stefik et al. | 345/331 |
| 5,008,853 | 4/1991 | Bly et al. | 345/331 |
| 5,040,142 | 8/1991 | Mori | 707/511 |
| 5,063,495 | 11/1991 | MacPhail | 707/500 |
| 5,159,669 | 10/1992 | Trigg et al. | 345/357 |
| 5,583,922 | 12/1996 | Davis et al. | 379/93 |
| 5,659,746 | 8/1997 | Bankert et al. | 707/205 |
| 5,819,084 | 10/1998 | Shapiro et al. | 707/10 |
| 5,928,329 | 7/1999 | Clark et al. | 709/227 |
| 6,023,708 | 2/2000 | Mendez et al. | 707/203 |
| 6,052,735 | 4/2000 | Ulrich et al. | 709/236 |
| 6,105,044 | * 8/2000 | DeRose et al. | 707/514 |

OTHER PUBLICATIONS

Roseman et al., Building Real Time Groupware with GroupKit, A Groupware Toolkit, ACM Transactions on Computer Human Interaction, 3(1), p. 66–106, 1996.

Roscheisen et al., Interaction Design for Shared World–Wide Web Annotations, Stanford University, Stanford, CA, 328–329, May 7–11, 1995.

Jesshope et al., Low–bandwidth multimedia tools for web-based lecture publishing, Engineering Science and Educationa Journal Aug. 1998.

Girgensohn et al. Developing Collaborative Applications on the World Wide Web, Tutorials CHI 98 18–23 Apr. 1998.

\* cited by examiner

Primary Examiner—Joseph H. Feild
(74) Attorney, Agent, or Firm—Felsman, Bradley, Vaden, Gunter & Dillon

(57) ABSTRACT

A method and system for uniformly indexing a network document displayed within a computer display screen in a computer network having a group of clients connectable to one or more servers, wherein the network document is composed of displayable components. Initially, all displayable components within the network document are identified. Next, the displayable components are serially evaluated against a profile list of particular displayable components within the network document, in response to identifying all displayable components within the network document. Finally, synchronization points are automatically inserted at predetermined locations within the network document, in response to serially evaluating the displayable components against the profile list, wherein each synchronization point is associated with a particular displayable component contained within the profile list, thereby permitting users reviewing copies of the same network document in varying display formats to refer to identical locations within the network document relative to the synchronization points, regardless of the type of display format utilized to display the network document at each of the group of clients within the computer network. The network document may be composed of a World Wide Web document. The web document is thus parsed and all components belonging to the component list are serially marked. This is accomplished utilizing a special tag for processing and a follow-up tag for display. The result is a uniform and consistent set of synchronization points throughout the document.

19 Claims, 11 Drawing Sheets

PROFILE LIST 240

| ELEMENT 242 | TAG 244 | TYPE 246 | PREPEND 248 | APPEND 250 | CAUSES SECTION INCREMENT 249 | CAUSES MAX WORD SPACE RESET 251 |
|---|---|---|---|---|---|---|
| PARAGRAPH | <P> | SERIAL | P- | | N | Y |
| IMAGE | <i> | FIGURE | F- | | N | N |
| HEADING | <H1> | FIGURE | H- | | Y | Y |
| TABLE | <TABLE> | FIGURE | F- | | N | N |
| ... | ... | ... | ... | | ... | ... |
| WORD MAX | | SERIAL | | | N | Y |
| SENTENCE | | SERIAL | | | N | Y |

Fig. 11

METHOD AND SYSTEM IN A COMPUTER NETWORK FOR AUTOMATICALLY ADDING SYNCHRONIZATION POINTS TO NETWORK DOCUMENTS

BACKGROUND OF THE INVENTION

1. Technical Field

The present invention relates in general to improved information processing systems. In particular, the present invention relates to computer network applications that permit information processing systems to process, transmit and display data. Still more particularly, the present invention relates to network browser applications. Still more particularly, the present invention relates to an improved method and system for indexing and displaying network documents.

2. Description of the Related Art

The development of computerized distributed information resources, such as the "Internet," allows users to link with servers and networks, and thus retrieve vast amounts of electronic information heretofore unavailable in an electronic medium. Such electronic information increasingly is displacing more conventional techniques of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Interface Program," a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex nonsequential web of associations that permit the user to "browse" through related topics, regardless of the presented order of the topics. These links are often established by both the author of a hypertext document and by the user, depending on the intent of the hypertext document. For example, traveling among hypertext links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Networked systems typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to "know" any working details about the other program or the service itself. In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources (e.g., newswire feeds or newsgroups). Based upon such requests by the user, the server presents filtered electronic information to the user as server responses to the client process. The client process may be active in a first computer system, and the server process may be active in a second computer system, and communicate with one another over a communications medium that allows multiple clients to take advantage of the information-gathering capabilities of the server.

Client and server communicate with one another utilizing the functionality provided by a hypertext transfer protocol (HTTP). The World Wide Web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname of the server ("www.uspto.gov"). The server name is associated with a unique numeric value (TCP/IP address). Active within the client is a first process, known as a "browser," that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data. Such "web pages" are also referred to as web or network documents.

A "web page" (also referred to by some designers simply as a "page") is a data file written in a hyper-text language that may have text, graphic images, and even multimedia objects such as sound recordings or moving video clips associated with that data file. The web page can be displayed as a viewable object within a computer system. A viewable object can contain one or more components such as spreadsheets, text, hotlinks, pictures, sound, and video objects. A web page can be constructed by loading one or more separate files into an active directory or file structure that is then displayed as a viewable object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger" than the physical size of the monitor screen, and devices such as graphical user interface scroll bars can be utilized by the viewing software (i.e., the browser) to view different portions of the web page.

A problem associated with network documents, such as web pages or web documents, is the inability of a user to uniformly locate identical locations within multiple copies of the same documents. Reviewing large documents "published" or displayed on the "web" is difficult because the display formats are dependent upon the type of browser being utilized, the display fonts available, and the window sizing on the display screen itself. Printing the document itself is not an alternative solution, because web documents printed as hardcopy text depend on the printer, the browser and the formatting. Thus, is impossible to refer to content based on a web page number or line number associated with a particular network document. A common solution to such problems is to include numbered header and document sections. However, such numbering and sectioning is limited in functionality and extensibility because the sections can stretch over several screens or pages, thus making it difficult for a user to determine which specific section of the document the user is actually reading or interpreting. Based on the foregoing, it can be appreciated that a need exists for a method and system which would allow users to view the same copy of a network or web document in varying display formats and be assured that they are viewing the same position in the document. An automated method and system for implementing such a feature would also be desirable, given the complexity associated with constructing and display network documents.

SUMMARY OF THE INVENTION

It is therefore one object of the present invention to provide for an improved information processing system.

It is therefore another object of the present invention to provide an improved computer network application that permits information processing systems to process, transmit, and display data.

It is yet another object of the present invention to provide improved method and system for an improved network browser application.

It is still another object of the present invention to provide an improved method and system for indexing and displaying network documents.

The above and other objects are achieved as is now described. A method and system are disclosed for uniformly indexing a network document displayed within a computer display screen in a computer network having a group of clients connectable to one or more servers, wherein the network document is composed of displayable components. Initially, all displayable components within the network document are identified. Next, a profile list of particular displayable components within the network document is serially compiled, in response to identifying all displayable components within the network document. Finally, synchronization points are automatically inserted at predetermined locations within the network document, in response to the serially compiling of the profile list, wherein each synchronization point is associated with a particular displayable component contained within the profile list, thereby permitting users reviewing copies of the same network document in varying display formats to refer to identical locations within the network document relative to the synchronization points, regardless of the type of display format utilized to display the network document at each of the group of clients within the computer network. The network document may be composed of a World Wide Web document. The web document is thus parsed and all components belonging to the component list are serially marked. This is accomplished utilizing a special tag for processing and a follow-up tag for display. The result is a uniform and consistent set of synchronization points throughout the document.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

FIG. 11 illustrates an example profile list which may be implemented in accordance with a preferred embodiment of the present invention;

DETAILED DESCRIPTION OF PREFERRED EMBODIMENT

Figure 1:
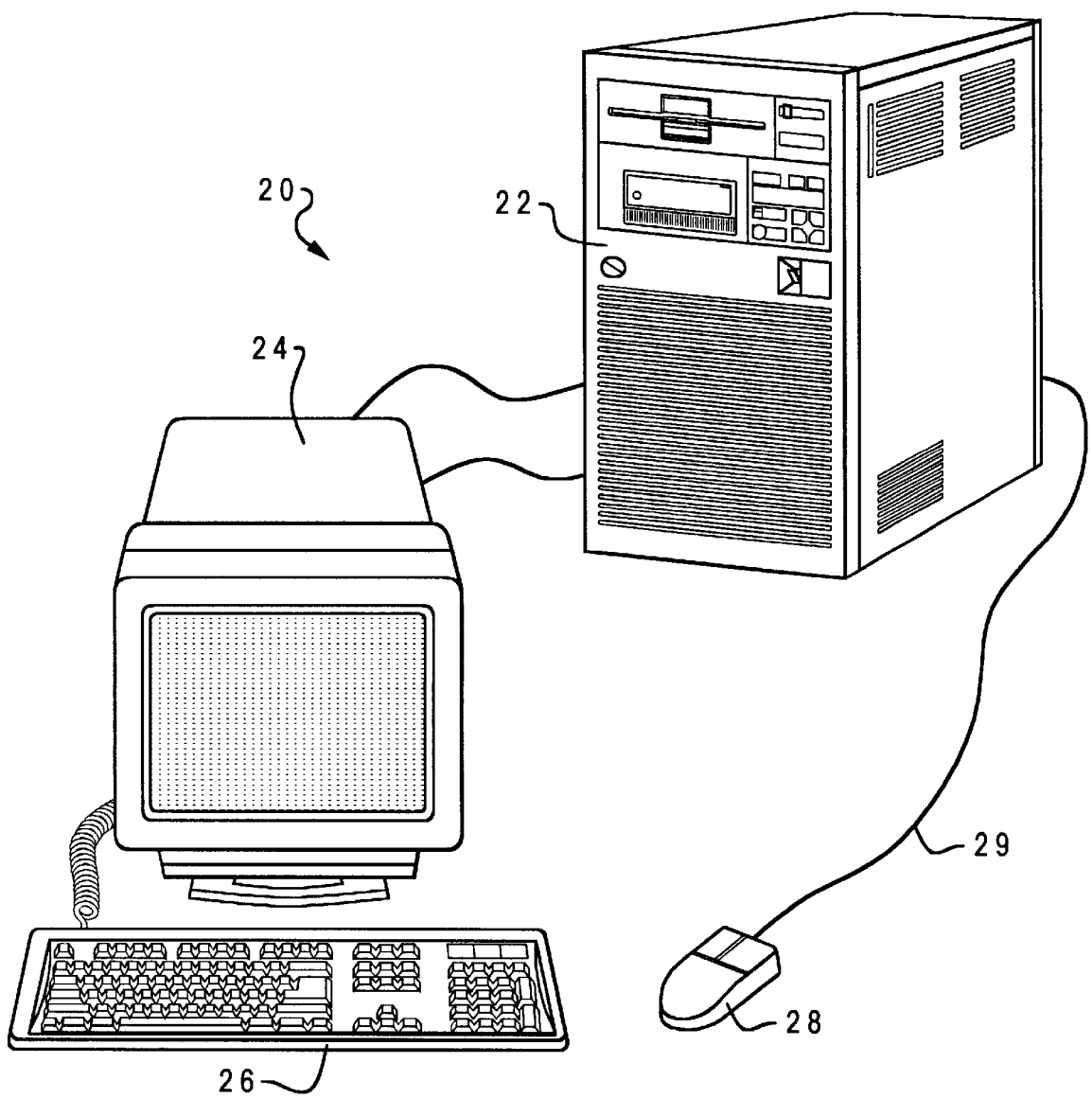
FIG. 1 illustrates a pictorial representation of a computer system which may be utilized to implement a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display terminal 24, a keyboard 26, and a mouse 28. Computer 20 can be implemented utilizing any suitable computer, such as an IBM Aptiva™ computer, a product of International Business Machines Corporation, located in Armonk, N.Y. "Aptiva" is a trademark of International Business Machines Corporation. However, those skilled in the art will appreciate that a preferred embodiment of the present invention can apply to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculatorlike numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Figure 2:
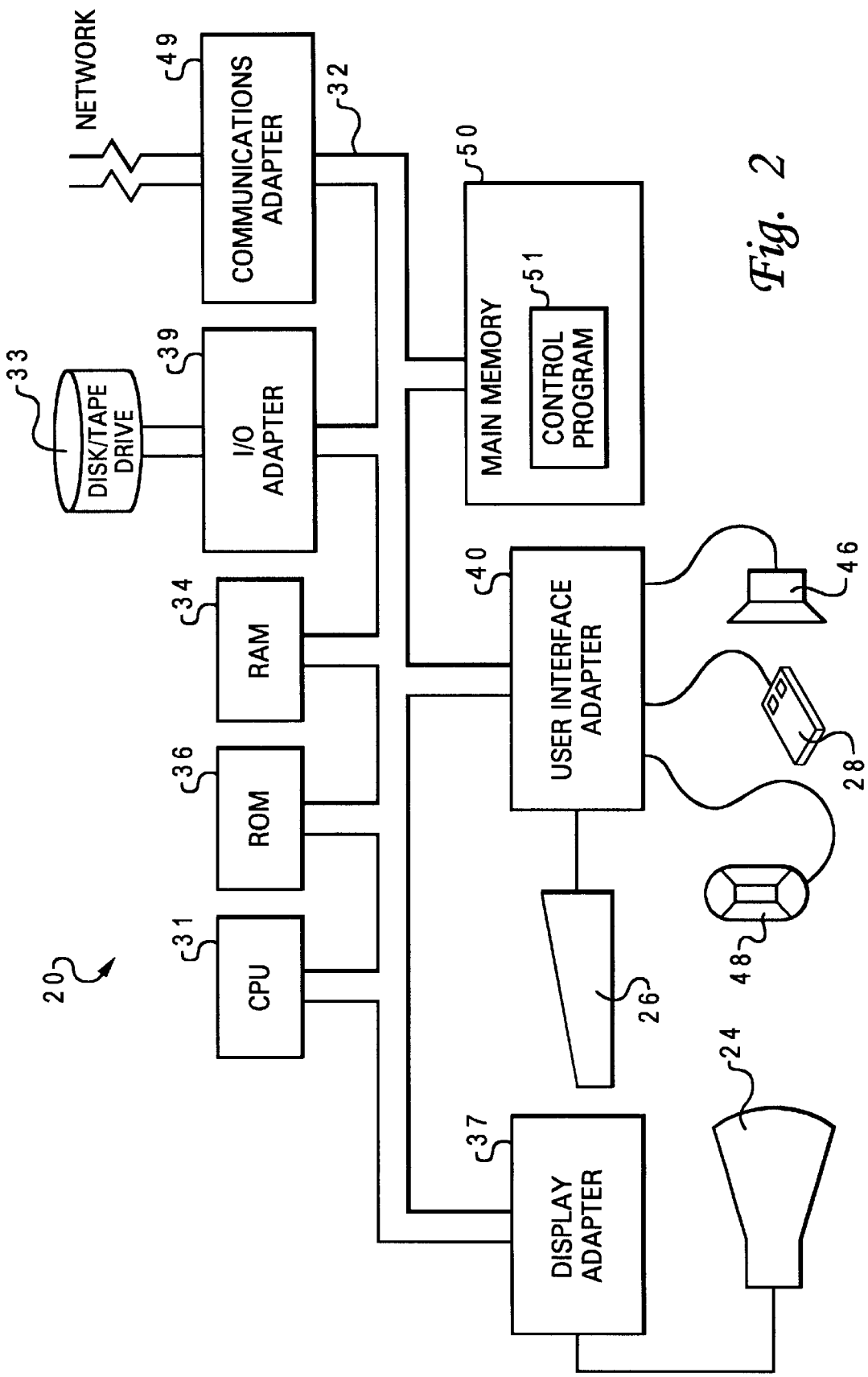
FIG. 2 depicts a representative hardware environment of the computer system illustrated in FIG. 1.

In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 is the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machinereadable media to direct the operation of computer system 20. Any suitable machinereadable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIXwindows windowing system can direct CPU 31. The AIX operating system is IBM's implementation of the UNIX operating system. UNIX is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer system 20 depicted in FIG. 1 and FIG. 2 to transmit information over standard telephone lines.

Figure 3:
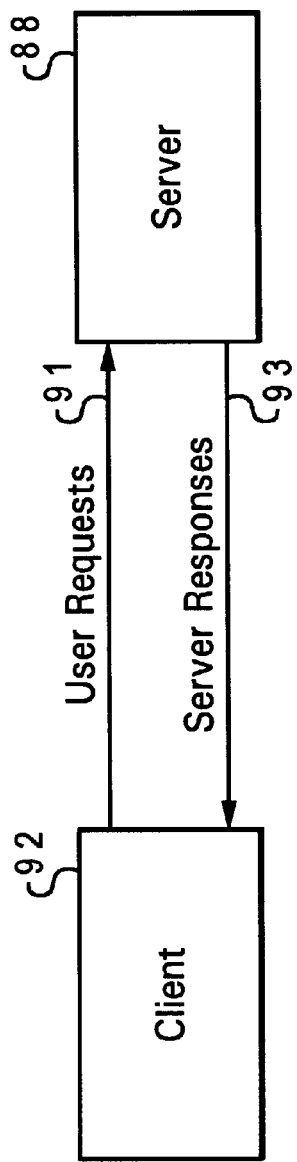
FIG. 3 illustrates a block diagram illustrative of a client/server architecture in accordance with a preferred embodiment of the present invention.
Figure 4:
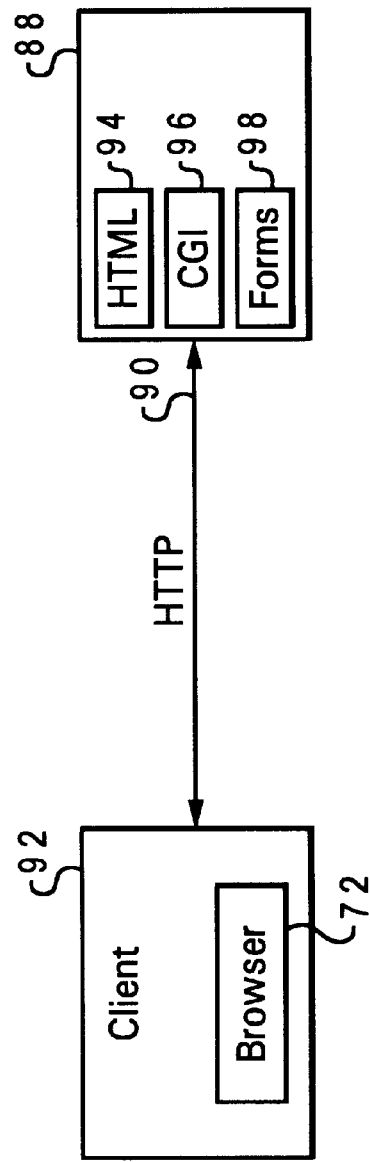
FIG. 4 depicts a detailed block diagram of a client/server architecture in accordance with a preferred embodiment of the present invention.
Figure 5:
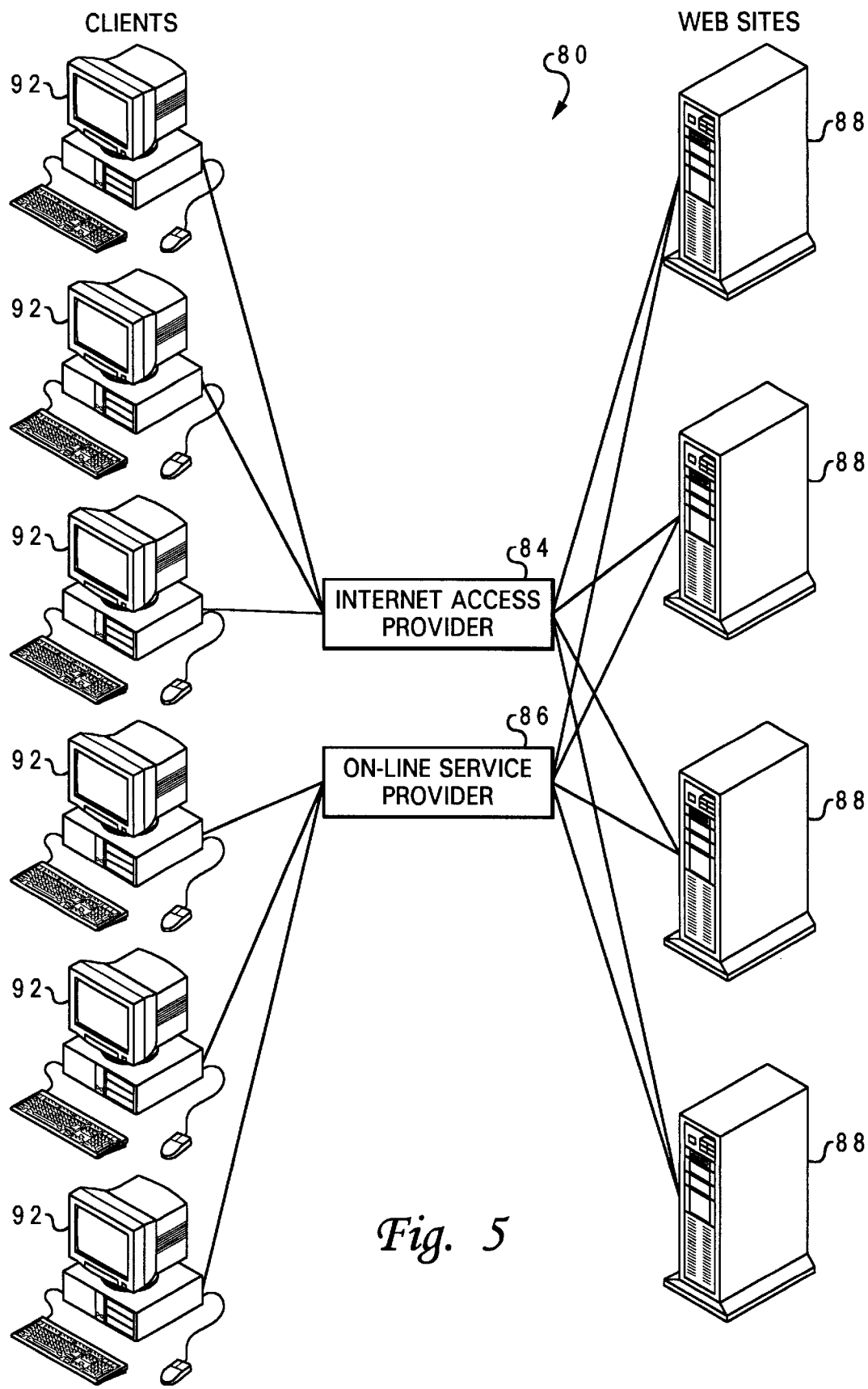
FIG. 5 is a diagram illustrative of a computer network which can be implemented in accordance with a preferred embodiment of the present invention.

In the illustrations depicted in FIG. 3, FIG. 4, and FIG. 5, like parts are indicated by like reference numerals. FIG. 3 illustrates a block diagram illustrative of a client/server architecture in accordance with a preferred embodiment of the present invention. In FIG. 3, user requests 91 for news are sent by a client application program 92 to a server 88. Server 88 can be a remote computer system accessible over the Internet or other communication networks. Client application program 92 may be utilized with computer 20 of FIG. 1 and the implementation of computer 20 illustrated in FIG. 2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the information-gathering capabilities of the server.

FIG. 4 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate by utilizing the functionality provided by HTTP. Active within client 92 is a first process, browser 72, which establishes connections with server 88, and presents information to the user. Any number of commercially or publicly available browsers can be utilized in various implementations in accordance with the preferred embodiment of the present invention. For example, a browser such as Netscape™ can be utilized in accordance with a preferred embodiment of the present invention to provide the functionality specified under HTTP. "Netscape" is a trademark of Netscape, Inc.

Server 88 executes the corresponding server software, which presents information to the client in the form of HTTP responses 90. The HTTP responses 90 correspond with the web pages represented utilizing HTML, or other data generated by server 88. Server 88 provides HTML 94. Under certain browsers, a Common Gateway Interface (CGI) 96 is also provided, which allows the client program to direct server 88 to commence execution of a specified program contained within server 88. This may include a search engine that scans received information in the server for presentation to the user controlling the client. Utilizing this interface, and HTTP responses 90, the server may notify the client of the results of that execution upon completion. Common Gateway Interface (CGI) 96 is one form of a gateway, a device utilized to connect dissimilar networks (i.e., networks utilizing different communications protocols) so that electronic information can be passed from one network to the other. Gateways transfer electronic information, converting such information to a form compatible with the protocols utilized by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers. This functionality allows the user via a client application program to specify terms in which the server causes an application program to function (e.g., terms or keywords contained in the types of stories/articles which are of interest to the user). This functionality is an integral part of the search engine.

FIG. 5 is a diagram illustrative of a computer network 80, which can be implemented in accordance with a preferred embodiment of the present invention. Computer network 80 is representative of the Internet, which can be described as a known computer network based on the client-server model discussed herein. Of course, those skilled in the art will appreciate that the Internet is not the only distributed computer network that may be utilized in accordance with a preferred embodiment of the present invention. Other distributed computer networks such as the so-called "intranets" well known in the art of computer networking can also be utilized to implement computer network 80. Conceptually, the Internet includes a large network of servers 88 that are accessible by clients 92, typically users of personal computers, through some private Internet access provider 84 (e.g., such as Internet America) or an on-line service provider 86 (e.g., such as America On-Line, Prodigy, Compuserve, and the like). Each of the clients 92 may run a browser to access servers 88 via the access providers. Each server 88 operates a so-called "web site" that supports files in the form of documents and pages. A network path to servers 88 is identified by a Universal Resource Locator (URL) having a known syntax for defining a network collection.

Figure 6:
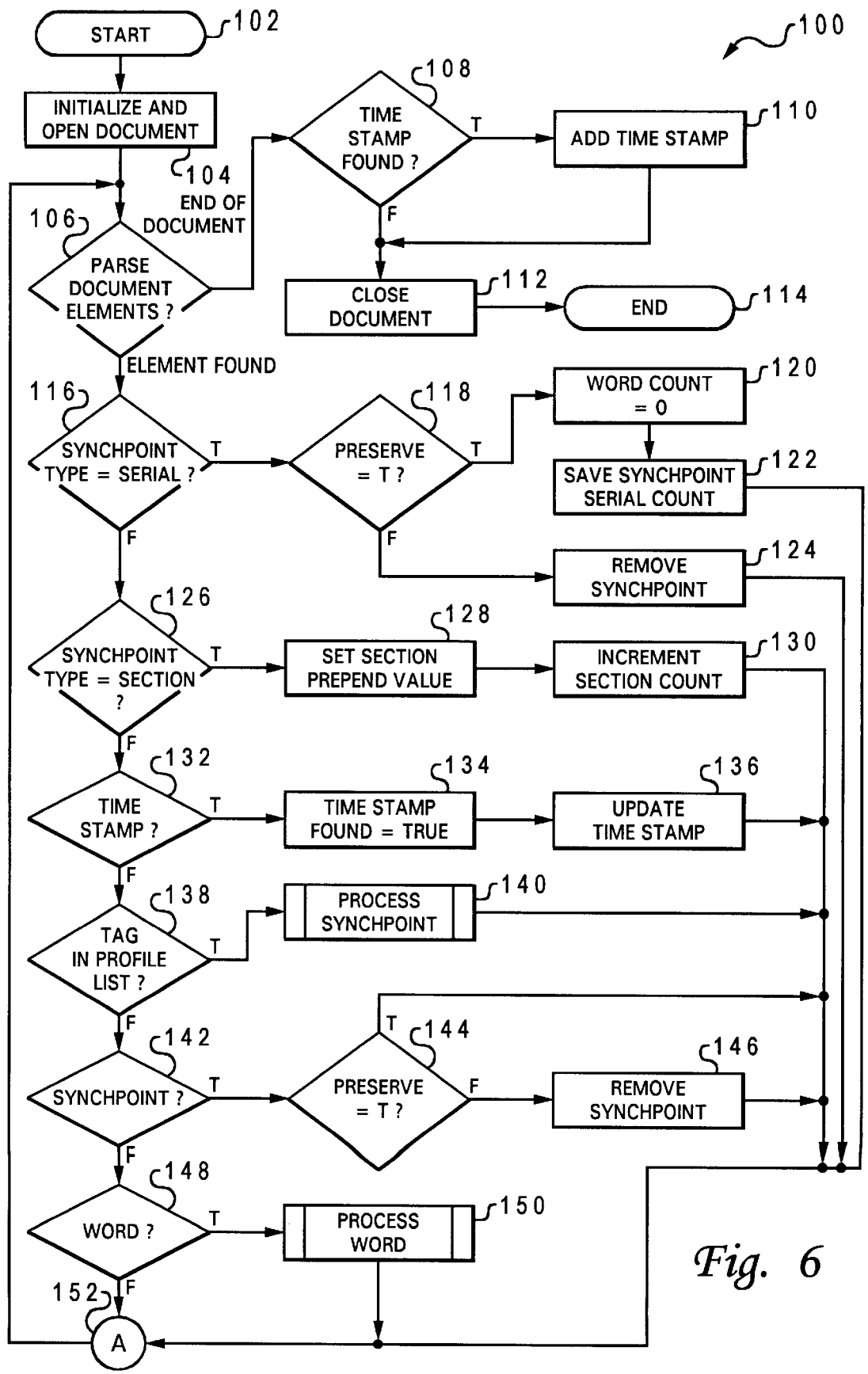
FIG. 6 depicts a high-level flow diagram that shows general steps utilized to carry out the method and system of the present invention, according to a preferred embodiment of the present invention.

FIG. 6 depicts a high-level flow diagram 100 that shows general steps utilized to carry out the method and system of the present invention, according to a preferred embodiment of the present invention. It can be appreciated by those skilled in the art that FIG. 6, FIG. 7, FIG. 8, FIG. 9, and FIG. 10 present a self-consistent sequence of steps leading to a desired result. The steps depicted in the high-level flow diagrams of FIG. 6, FIG. 7, FIG. 8, FIG. 9, and FIG. 10 are those steps requiring the physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "identifying" or "compiling," which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 of FIG. 1 and FIG. 2, in processing electrical or other (e.g. mechanical, chemical) physical signals to generate other desired physical signals. FIG. 6, FIG. 7, FIG. 8, FIG. 9, and FIG. 10 illustrate an algorithm based on a philosophy where content is examined to drive synchronization points. Once a synchronization point is added to a document, it remains in place until it is moved manually by a user, or the entire document is resynchronized.

Thus, as depicted at block 102, the process is initiated. As indicated at block 104, a document within a computer network, such as the client/server network depicted in FIG. 3 to FIG. 5 herein, is opened and values for processing are initialized (e.g., section count=0, word count=0, serial count=0, etc.). The network document is established at a server within the computer network and may be viewed on a display screen of a computer within the computer network. As illustrated at block 106, document elements are parsed and a test is performed to determine whether or not an element has been found or the end of the document has been reached. In the operation described at block 106, the document is parsed, and all displayable components (i.e. elements) of interest belonging to the profile list within the document are serially marked If, after parsing the document elements, the end of the document has been reached, then as depicted at block 108, a test is performed to determine whether or not a time stamp has been found. If a time stamp has not been found, the time stamp is added to the document, and as depicted at block 112, the document is closed. The process then terminates, as illustrated at block 114. However, if a time stamp has been found, then the document is simply closed as described at block 112, and the process then ends, as illustrated at block 114. The result is a synchronized document that always receives a time stamp (e.g., see the operations described at blocks 132 to 136 of FIG. 6 herein).

If, as illustrated at block 106, an element of interest is found due to parsing, then as indicated at block 116, a test is performed to determine whether or not the synchronization point (i.e., "SYNCHPOINT") type is of a serial nature If the synchronization point type is serial (i.e., "True" as indicated by "T" in FIG. 6), then a test is performed to determine whether or not to preserve the synchronization point (i.e., "PRESERVE=T"). Based on profile settings (e.g., see FIG. 12 and related description herein), if it is determined to preserve the synchronization point type, then as indicated at block 120, a word count is set equal to "0" and then as indicated at block 122, a synchronization point serial count is saved. The process then continues, as indicated at block 152 (i.e. "A"), which in turn initiates a repetition of the operations described beginning at block 106. If it is determined not to preserve the synchronization point type, as illustrated at block 118, then as described at block 124, the synchronization point is removed, and the operation described at block 152 is processed. If, as indicated at block 116, the synchronization type is not serial (i.e., "F" or "False"), then a test is performed to determine whether or not the encountered synchronization point comprises a section of the document.

If this is the case, then as illustrated at block 128, a section "prepend" value is set. Thereafter, as indicated at block 130, a section count is incremented. The process then continues, is indicated by the flow marker at block 152. Thus, following processing of the operation described at block 130, the logical flow of operations continue, as indicated by the flow marker of block 152. If, as indicated at block 126, the synchronization tag comprises a document section, then as depicted at block 132, a test is performed to determine whether or not a time stamp has been found. If the time stamp has been found, as indicated at block 134, the time stamp is thereafter updated, as described at block 136. If, however, the time stamp has not been found, then as indicated at block 138, a test is performed to determine if the HTML "tag" is found in the profile list, as illustrated at block 240.

The operation described at block 138 essentially is a step which deals with HTML tags that are encountered during processing of the operations described herein. The tags themselves are composed of mark-up language (e.g., HTML) tags, which are well known in the art and are essentially codes that identify an element in a document, such as a heading or paragraph, for the purposes of formatting and linking information within the document. Each tag is composed of a pair of angle brackets that contain one or more letters and numbers. The profile list, as implemented in accordance with a preferred embodiment of the present invention can, for example, include paragraphs, images, and headers. If the tag is found in the profile list, then it is a valued element, and as illustrated at block 140, it is processed (i.e., "Process Synchpoint," as indicated at block 140). Specific steps which may be utilized for processing of valued elements are illustrated in FIG. 7 herein.

Figure 8:
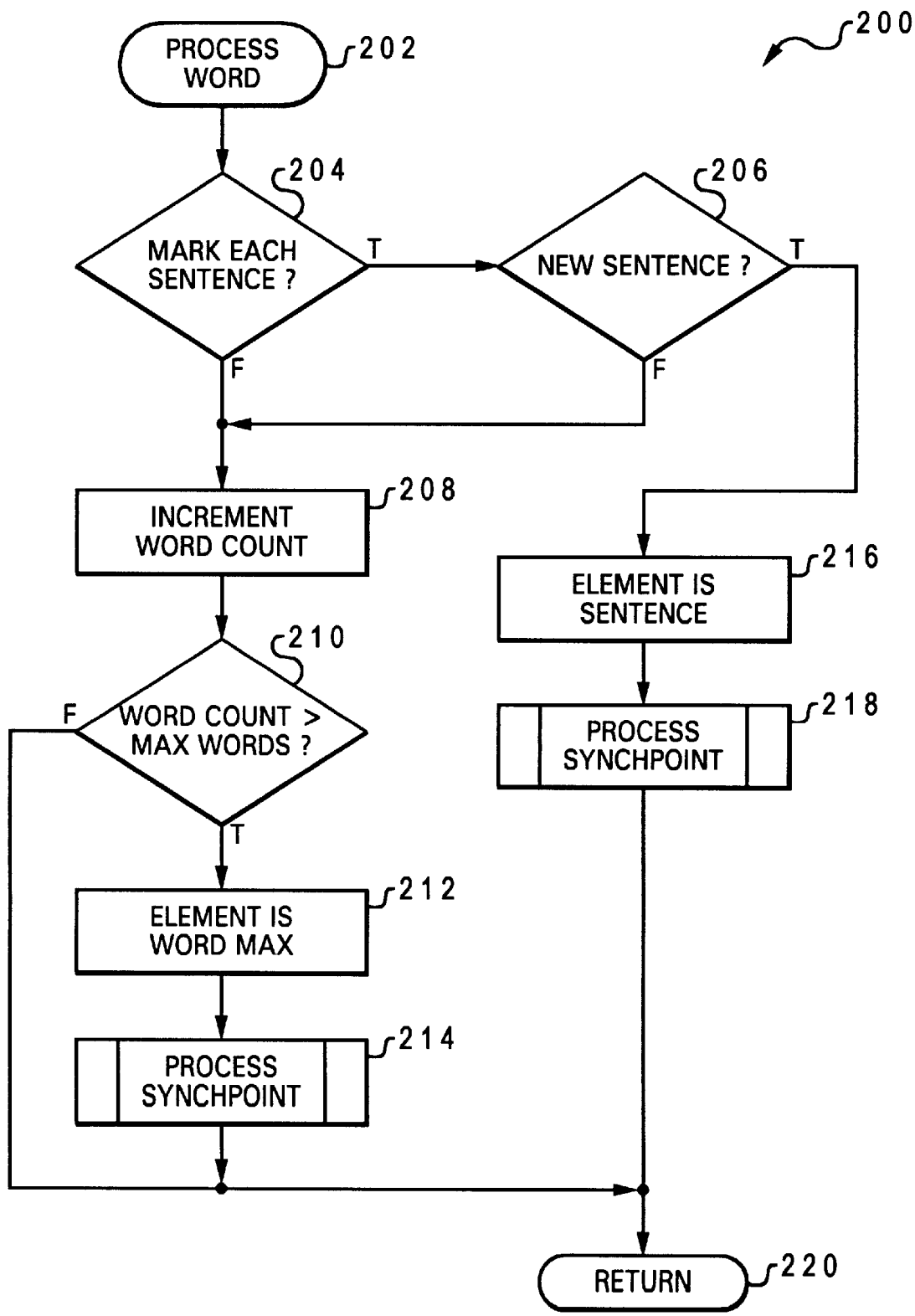
FIG. 8 depicts a high-level flow diagram that shows steps utilized to carry out process word operations, in accordance with a preferred embodiment of the present invention.

If the tag is not a valued tag in the profile, then as indicated at block 142, a test is performed to determine whether the element is some other type of synchronization point. If it is determined that the element is a synchronization point, then as indicated at block 144, a test (i.e., "PRESERVE=T") is performed to determine whether or not the profile indicates that preservation of the synchronization point is desired. If it is determined, as illustrated at block 144, to preserve the synchronization point, then processing continues, as illustrated at block 152. If, however, it is determined not to preserve the synchronization point, as described at block 144, then the synchronization point is removed, as indicated at block 146. If, as depicted at block 142, it is determined that the element was not a synchronization point, then as illustrated at block 148, a test is performed to determine whether or not the encountered element comprises a word. If the encountered element comprises a word, then, specific steps illustrating processing of the word occur, as depicted in FIG. 8. If the encountered element does not comprise a word, then the element is simply ignored and processing continues, as indicated at block 152. Following completion of the operations described at block 150, processing continues, as indicated at block 152.

Figure 7:
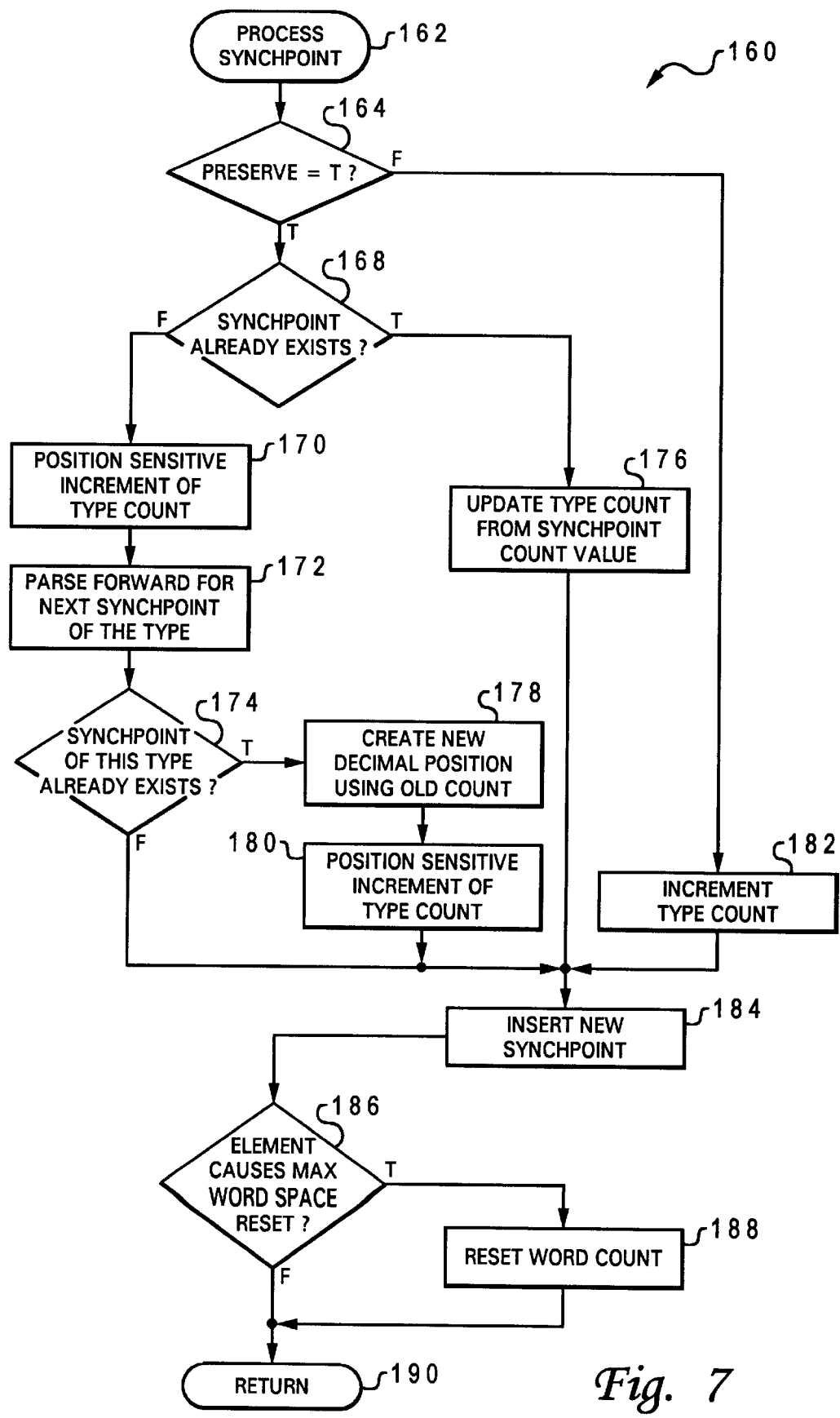
FIG. 7 illustrates a high-level flow diagram that shows steps utilized to carry out process value element operations, in accordance with a preferred embodiment of the present invention.

FIG. 7 illustrates a high-level flow diagram 160 that shows steps utilized to carry out process valued element operations, in accordance with a preferred embodiment of the present invention. The purpose of the routine described in FIG. 7 is to determine what the synchronization point values should be according to the circumstances and settings, and then insert the synchronization points at the proper locations with the network or compound document. The operations described in FIG. 7 represent the operation indicated at block 140 in FIG. 6. A "valued element" as referred to herein, may be composed of an HTML tag or other feature in the profile list. In FIG. 7, the most common type (i.e. valued elements) of synchronization points are processed.

Thus, as illustrated at block 162, the steps for processing valued elements (e.g., displayable components) within a compound document are initiated. As indicated thereafter at block 164, a test is performed to determine whether or not to preserve synchronization points in the compound document. If it is determined not to preserve synchronization points, then as indicated at block 182, a "type count" is incremented. The "type count" is the value associated with the type (e.g., see "type" column 246 in FIG. 11) of element (e.g., see "element" column 242 in FIG. 11) that occurs in the test indicated at block 164. Operations described at block 184 are then processed (i.e., generating a new synchronization point).

If it is determined, as illustrated at block 164, to preserve the synchronization points, then as described at block 168, a test is performed to determine whether or not a synchronization point already exists in the compound document for this valued element. If it is determined that a synchronization point already exists in the compound for the valued element, then as indicated at block 176, the "type count" is updated from the original count value found in the existing synchronization point, which preserves the original synchronization points and prepares the compound document for the insertion of new synchronization points. The operation described at block 184 is then processed. In the operation described at block 184, the synchronization point is essentially printed and any "old" synchronization points, if existing at the time of the processing of the operation described at block 184, are removed. The operation described at block 184 is illustrated in greater detail in FIG. 10. If, however, it is determined that the synchronization point does not already exist, as illustrated at block 168, then as depicted at block 170, the type count is incremented with sensitivity to decimal position, as described in FIG. 9.

Figures 9, 10:
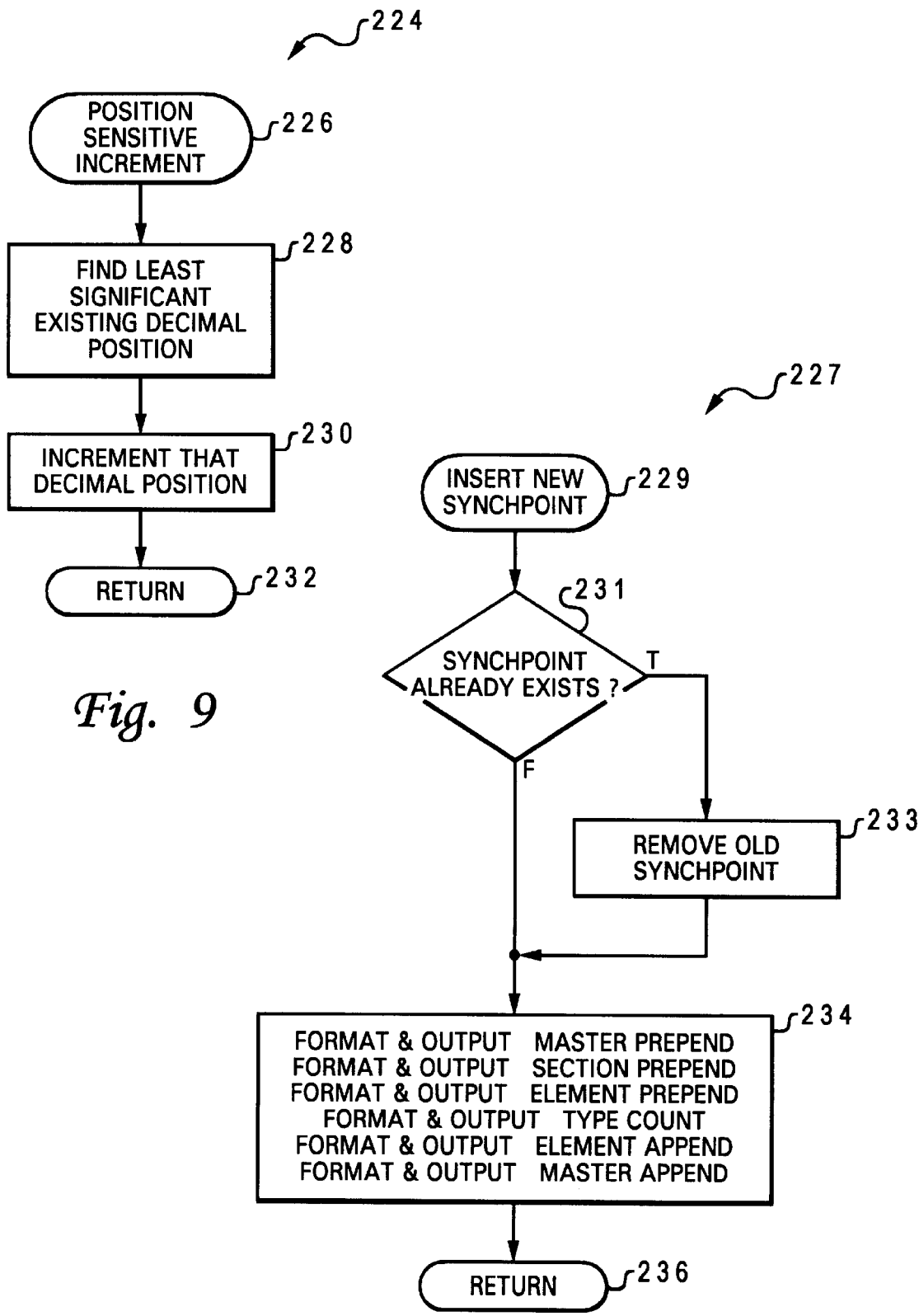
FIG. 9 illustrates a high-level flow diagram that shows steps utilized to carry out position sensitive increment operations, in accordance with a preferred embodiment of the present invention.
FIG. 10 depicts a high-level flow diagram that shows steps utilized to carry out the generation and insertion of new synchronization points, in accordance with a preferred embodiment of the present invention.

As illustrated thereafter at block 172, parsing is accomplished forward through the document to the next synchronization point of the same type. As indicated next at block 174, a test is performed to determine whether or not a matching synchronization point of this type already exists. If it is determined that a matching synchronization point of this type with the same value already exists, then as illustrated at block 178, a new decimal position is created utilizing the old count. The new decimal position is created for the synchronization point to take into account the positioning of any prior or subsequent synchronization points in the compound document, without damaging the existing ordering of synchronization points within the compound or network document under consideration. Thereafter, as indicated at block 180, the type count is incremented with respect to the decimal position created, as described herein (i.e., see block 178). The operations described in FIG. 9 illustrate in greater detail, the operations depicted at block 180. As indicated thereafter at block 184, a new synchronization point is then inserted at the proper location in the network or compound document to which the synchronization points are being added. In other words, the new synchronization point is printed out and the older or existing synchronization points are removed.

If it is determined, as illustrated at block 174, that a synchronization point of this type and value does not already exist, then the operations described at 178 and 180 are not processed, and processing of the step indicated block 184 continues thereafter. In essence, synchronization points are "created" by the time the operation depicted at block 184 is processed through to completion. The operation described in block 184 is described in greater detail in FIG. 10 herein. Thereafter, as illustrated at block 186, a test is performed to determine whether or not the identified element or displayable component within the compound document causes a maximum word space to be reset (e.g., see column 251 in FIG. 11 and related description herein). If so, the word count is reset, as illustrated at block 188. If not, the operations return for processing, as indicated at block 190.

FIG. 8 depicts a high-level flow diagram 200 that shows steps utilized to carry out processing for a word, in accordance with a preferred embodiment of the present invention. As illustrated at block 202, process word operations are initiated. As indicated at block 204, a test is performed to determine whether or not the profile indicates to mark each sentence within the compound document (e.g., see 272f in FIG. 12 herein). If so, then a test is performed, as indicated at block 206 to determine whether or not the element indicates a new sentence. If so, then the element flag is set as a sentence, as illustrated at block 216. As indicated at block 218, the sentence element is processed, according to the operations described in FIG. 7. Thereafter, as indicated at block 220, the operations return to processing of the steps described in FIG. 6. If, as indicated at block 204, each sentence is not marked, then as depicted at block 208, the word count is incremented. As described subsequently at block 210, a test is performed to determine whether or not the present word count is greater than a maximum number of words. If not, then the operation indicated at block 220 is processed. If so, then the element type is set as "word max", as indicated at block 212, and the element is processed as a valued element, as illustrated at block 214. The operations then return to normal processing, as indicated at block 220.

FIG. 9 illustrates a high-level flow diagram 224 that shows steps utilized to carry out position sensitive increment operations, in accordance with a preferred embodiment of the present invention. As illustrated at block 226, position sensitive incrementing is initiated. Thereafter, as depicted at block 228, the least significant existing decimal position is found. That particular decimal position is then incremented, and the operations return to processing normally, as indicated at block 232.

FIG. 10 depicts a high-level flow diagram 227 that shows steps utilized to carry out the generation and insertion of new synchronization points, in accordance with a preferred embodiment of the present invention. As depicted at block 229 (i.e., "insert new synchpoint"), the generation of new synchronization points is initiated. Thereafter, as illustrated at block 231, a test is performed to determine whether or not a synchronization point already exists at this place in the compound document. If a synchronization point already exists, then as indicated at block 233, the old synchronization point is removed, and the operations depicted at block 234 are processed. However, if it is determined that the synchronization point does not already exist, then as indicated at block 234, a master "prepend," section "prepend," "element prepend," "type count," "element append," and "master append" are formatted and output. The operations then continue processing normally as indicated by the "RETURN" of block 236. For example, the 6th image would be: <SYNCHPOINT=FIGURE><SUB>(F-6)</SUB></SYNCHPOINT>. The operations depicted in FIG. 10 essentially describe a print routine, in which the synchronization points are printed and any older or existing synchronization points are removed.

Based on the foregoing, it can be appreciated that a method and system are presented for uniformly indexing a network document displayed within a computer display screen in a computer network having a group of clients connectable to one or more servers, wherein the network document is composed of displayable components. Initially, all displayable components within the network document are identified. Next, each displayable component within the network document (e.g, compound document) is serially identified and evaluated against a profile list of particular displayable components, in response to identifying all displayable components within the network document. Finally, synchronization points are automatically inserted at predetermined locations within the network document, wherein each synchronization point is associated with a particular displayable component contained within the profile list, thereby permitting users reviewing copies of the same network document in varying display formats to refer to identical locations within the network document relative to the synchronization points, regardless of the type of display format utilized to display the network document at each of the group of clients within the computer network. The network document may be composed of a World Wide Web document. The web document is thus parsed and all components belonging to the component list are serially marked. This is accomplished utilizing a special tag for processing and a follow-up tag for display. The result is a uniform and consistent set of synchronization points throughout the document.

The profile list indicates those elements of a document which should be processed as synchronization points. The profile list might be composed of paragraphs and headers. Alternatively, the profile can determine to place a synchronization point after every 100 visible words. A tag is inserted into the document as: <SYNCHPOINT=& TYPE><SUB> (12345)</SUB>. In addition, a default operation can be implemented, according to a preferred embodiment of the present invention, in which all synchronization points may be renumbered from the beginning of the document. However, an option can also be provided, based on the method and system described herein, wherein point numbers are inserted in such a way as to maintain the original synchronization point format. Extensions of the synchronization points can also be implemented in accordance with a preferred embodiment of the present invention such that the synchronization points can be started at a specific number. In order that the numbering maintains a certain base in certain areas of the document, the synchronization points can also be set so that all synchronization points in a section have a special prefix (e.g., A1, A2, A3, and so forth). Such provisions enable changes to be made to a document without resulting in the renumbering of the entire document.

In addition, a master synchronization value can be implemented, in accordance with a preferred embodiment of the present invention, as either a date/time or revision number which can be inserted into the document. Those skilled in the art will appreciate that other features may be implemented in accordance with a preferred embodiment of the present invention, such as a filter which removes all synchronization points needed for final publication, display, and so forth. Such features can be embodied in a program product which provides such services. Services to utilize synchronization points can also be built into web browsers and printer drivers, such as finding synchronization points, checking information maintained between checkpoints for change, and so forth.

FIG. 11 illustrates an example profile list 240 which may be implemented in accordance with a preferred embodiment of the present invention. Profile list 240 is essentially a controlling table which controls the behavior of the synchronization point process described herein. Profile list 240 includes an element column 242 which lists type of elements or displayable components that are parsed and organized according the method and system described herein. For example, elements within element column 242 include "paragraph," "image," "heading" and "word max sentence." Associated with each element is a tag. Each tag is listed in tag column 244. A "<P>" tag, for example is associated with the "paragraph" element. The tags listed in tag column 244 assist the underlying code or processing routines in recognizing elements. The "type" of element is listed in a type column 246. For example, the "paragraph" element listed in the element column 242 is of a "serial" type, as indicated in type column 246. Codes determining whether "prepend" or "append" operations take place respectively reside in prepend column 248 and append column 250 (i.e., a prepend/append value). The prepend characters listed in prepend column 248 are essentially small character values added in front the synchronization points when the synchronization points are actually printed. A "yes" or "no" code in column 249 determines whether a section increment occurs, while a "yes" or "no" code in column 251 causes a "max-word space" to be reset. The "word max" element listed in element column 242 may be set according to the operation described at block 212 in FIG. 8 herein. The "sentence" element listed in element column 242 may be set according to the operation described at block 216 in FIG. 8 herein. The elements indicated in column 242 may thus be recognized by comparison to a tag in the document (e.g, see block 138 of FIG. 6) or by setting a flag (see blocks 212 and 216 of FIG. 8).

Figure 12:
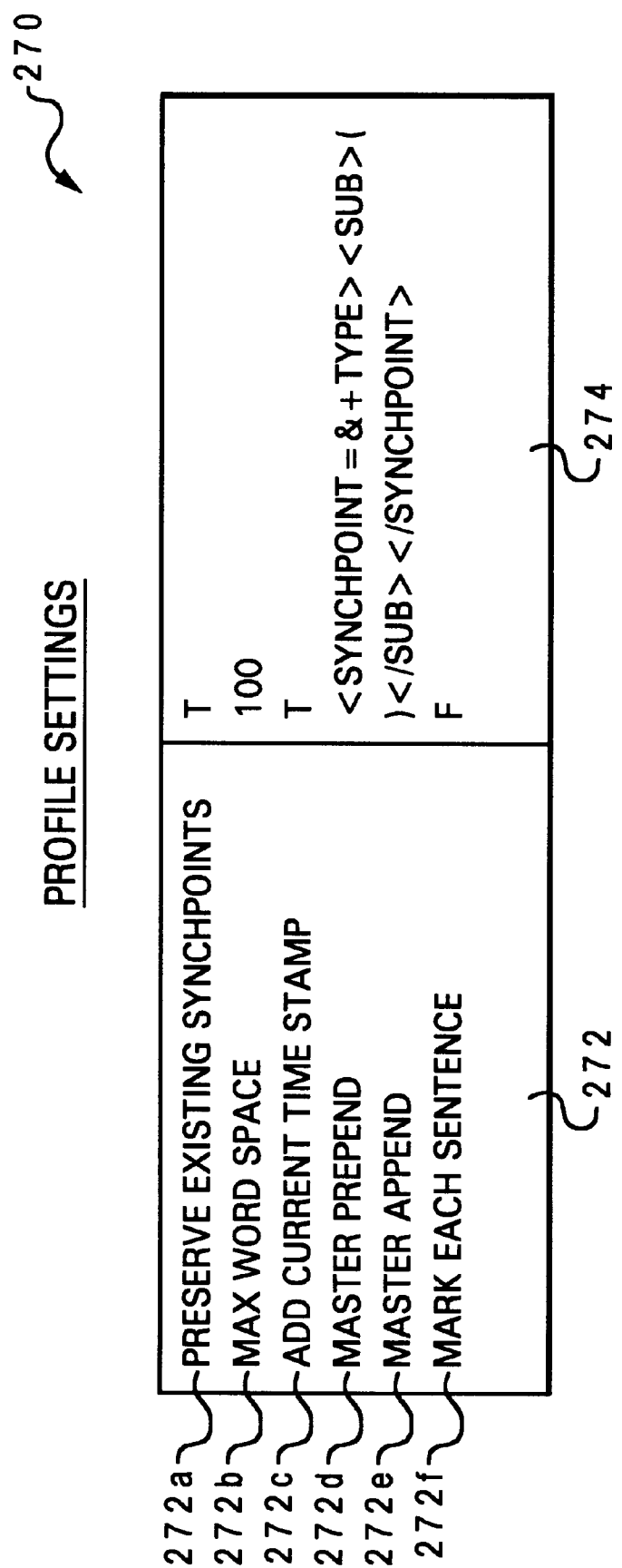
FIG. 12 depicts example profile settings in accordance with a preferred embodiment of the present invention.

FIG. 12 depicts example profile settings 270, in accordance with a preferred embodiment of the present invention. The profile list of FIG. 11 and the profile settings in FIG. 12 may be set by a user via a "profile". Column 272 includes profile settings, such as "preserve existing synchpoints" as indicated at 272a, "max word space" as indicated at 272b, "add current time stamp" as illustrated at 272c, "master prepend" as depicted at 272d, "master append" as indicated at 272e, and "mark each sentence" as illustrated at 272f. The settings are set or denied or modified based on the codes provided in column 274. For example, a "T" or "true" code in column 274 associated with "preserve existing synchpoints" indicates that existing synchpoints are to be preserved. An "F" or "false" code associated with "mark each sentence" indicates that sentences are not to be marked. It is envisioned that such codes and settings may be modified by a user via a computer or data-processing application designed to implement an embodiment of the present invention. For example, the codes and settings may be set within a user-set profile, or can be positioned in a profile that is transmitted or embedded within the "front" portion of a network or compound document.

Figure 13:
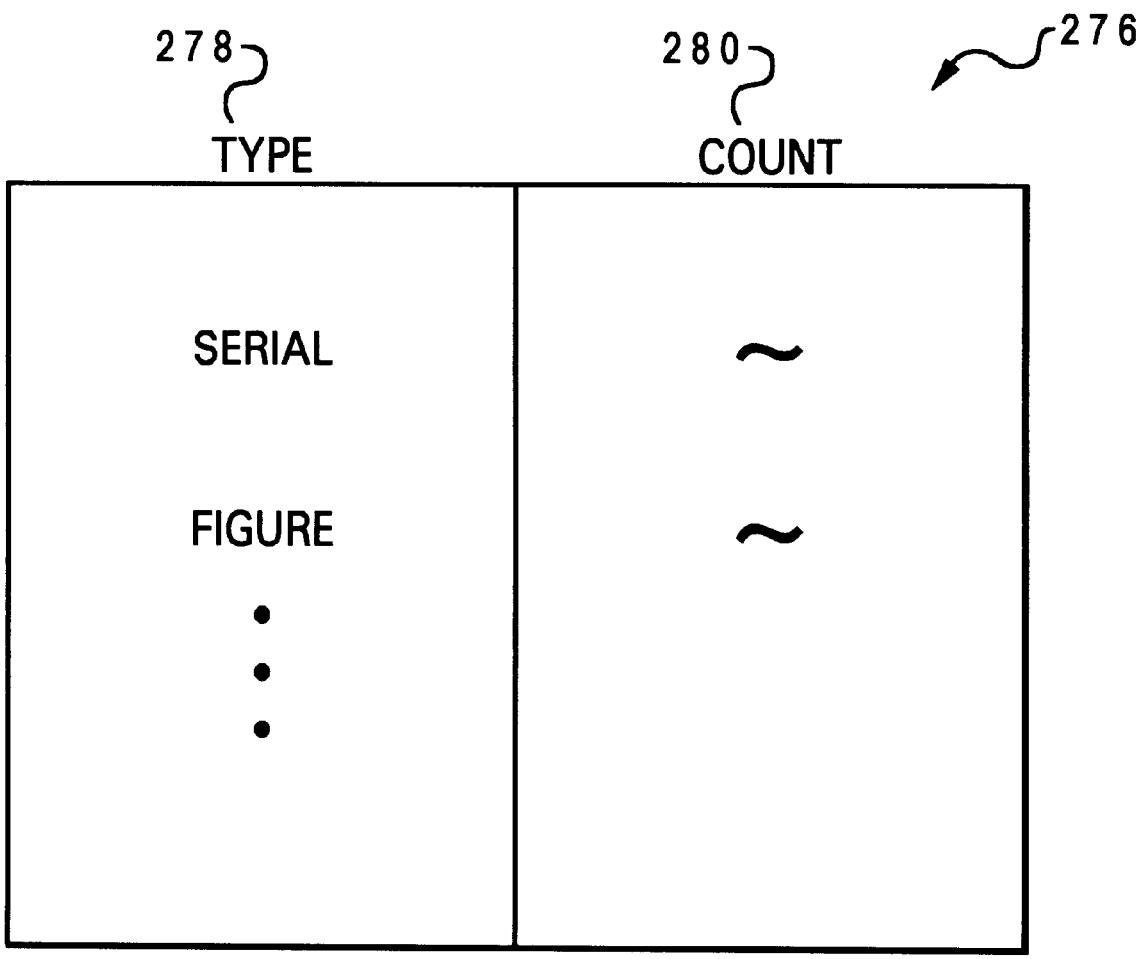
FIG. 13 illustrates "type" and "count" in accordance with a preferred embodiment of the present invention.

FIG. 13 illustrates "type" and "count" in accordance with a preferred embodiment of the present invention. A type column 278 includes "serial" and "figure" types from column 246, and column 280 illustrates the current count for that particular type during processing (i.e., internal processing). For example, the "figure" type listed in column 278 may be composed of a "table" and "image" elements as indicated in element column 242 of FIG. 11. Regardless of the type of "figure" element encountered (i.e., either "table" or "image"), whenever a figure element is encountered, a "count" is added in column 280 until all "figure" elements in the network or compound document under consideration are counted. The same condition holds true for the "serial" type listed in "type" column 278. Referring momentarily again to FIG. 11, one can appreciate that both the "word max" and "sentence" elements in element column 242 are or the serial type. Thus, whenever one of these "serial" type elements are encountered, an additional count is included in column 280 of FIG. 13.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. For example, the invention described herein may be modified to be utilized as a foundation for indexing and cross-referencing processing operations. Thus, the description as set forth is not intended to be exhaustive or to limit the invention to the precise form disclosed. Many modifications and variations are possible in light of the above teaching without departing from the spirit and scope of the following claims.

What is claimed is:

1. A method for uniformly indexing a network document displayed within a computer display screen in a computer network having a plurality of clients connected to one or more servers, wherein said network document includes at least one displayable component, said method comprising the steps of:

identifying all displayable components within said network document;

serially evaluating said displayable components against a profile list of particular displayable components within said network document, in response to identifying all displayable components within said network document; and automatically inserting synchronization points at predetermined locations within said network document, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients.

2. The method of claim 1, wherein said step of identifying all displayable components within said network document further comprises the step of:

parsing said network document into displayable components.

3. The method of claim 1, further comprising the step of:

preserving existing synchronization points within said network document, in response to serially evaluating said displayable components against said profile list.

4. The method of claim 6, wherein said automatically inserting step further comprises the step of:

automatically inserting values between synchronization points at predetermined locations within said network document while preserving existing synchronization points, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients.

5. A system for uniformly indexing a network document displayed within a computer display screen in a computer network having a plurality of clients connectable to one or more servers, wherein said network document is composed of displayable components, said system comprising:

means for identifying all displayable components within said network document;

means for serially evaluating said displayable components against a profile list of particular displayable components within said network document, in response to identifying all displayable components within said network document; and means for automatically inserting synchronization points at predetermined locations within said network document, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients.

6. The system of claim 5 wherein said means for identifying all displayable components within said network document further comprises:

means for parsing said network document into displayable components.

7. The system of claim 6 wherein said network document comprises a web document.

8. The system of claim 7 wherein said profile list of particular displayable components within said network document comprises a profile list of paragraphs and headers.

9. The system of claim 8 wherein said profile list of particular displayable components within said network document comprises a profile list of visible words.

10. The system of claim 9 wherein said display format utilized to display said network document at each of said plurality of clients further comprises:

a printable display format.

11. The system of claim 10 wherein said profile list of particular displayable components within said network document comprises a profile list that includes sentences.

12. The system of claim 11 wherein said profile list of particular displayable components within said network document comprises a profile list that includes section notation.

13. The system of claim 12 wherein said profile list of particular displayable components within said network document comprises a profile list that includes images.

14. The system of claim 13 further comprising:

means for preserving existing synchronization points within said network document, in response to serially evaluating said displayable components against said profile list.

15. The system of claim 14 wherein said means for automatically inserting synchronization points at predetermined locations within said network document, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients, further comprises:

means for automatically inserting values between synchronization points at predetermined locations within said network document while preserving existing synchronization points, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients.

16. A program product residing in a computer memory in a computer for uniformly indexing a network document displayed within a computer display screen in a computer network having a plurality of clients connectable to one or more servers, wherein said network document is composed of displayable components, said program product comprising:

instruction means residing in a computer for identifying all displayable components within said network document;

instruction means residing in a computer for serially evaluating said displayable components against a profile list of particular displayable components within said network document, in response to identifying all displayable components within said network document; and instruction means residing in a computer for automatically inserting synchronization points at predetermined locations within said network document, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients.

17. The program product of claim 16 wherein said instruction means residing in a computer for identifying all displayable components within said network document further comprises:

instruction means residing in a computer for parsing said network document into displayable components.

18. The program product of claim 16 further comprising:

instruction means residing in a computer for preserving existing synchronization points within said network document, in response to serially evaluating said displayable components against said profile list.

19. The program product of claim 18 wherein said instruction means residing in a computer for automatically inserting synchronization points at predetermined locations within said network document, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients, further comprises:

instruction means residing in a computer for automatically inserting values between synchronization points at predetermined locations within said network document while preserving existing synchronization points, in response to serially evaluating said displayable components against said profile list, wherein each synchronization point is associated with a particular displayable component contained within said profile list, thereby permitting users reviewing copies of the same network document in varying display formats to refer to identical locations within said network document relative to said synchronization points, regardless of the type of display format utilized to display said network document at each of said plurality of clients.

* * * * *